April 19, 1966  R. A. KAENEL  3,247,457
ANALOG SIGNAL PEAK DETECTOR USING TAPPED
DELAY LINE AND SAMPLING MEANS
Filed May 22, 1961
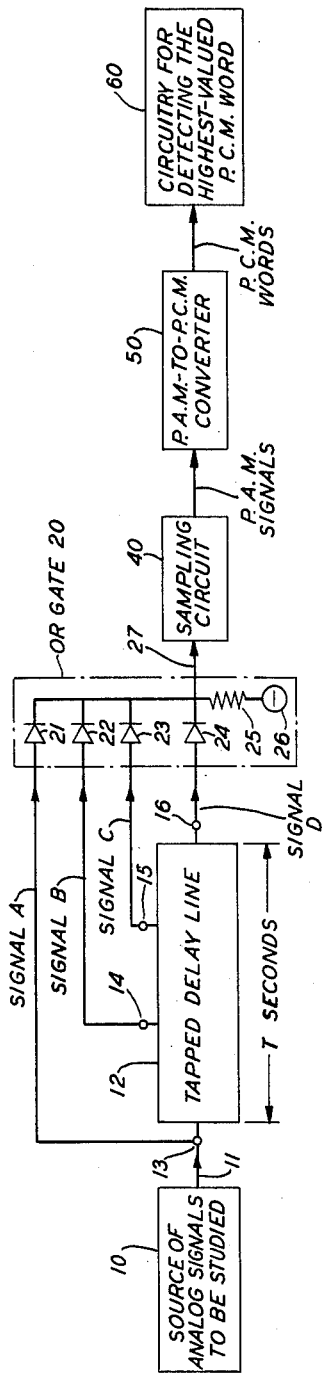
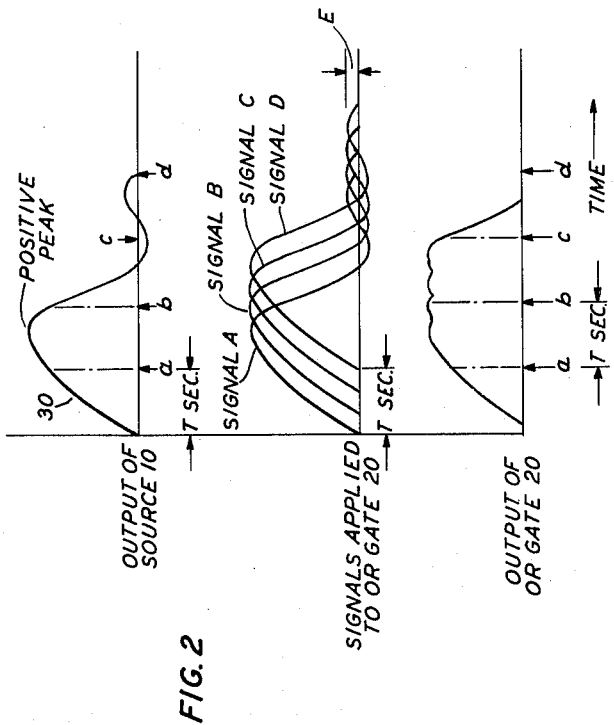
INVENTOR
R. A. KAENEL
BY Lucian C. Canepa
ATTORNEY 3,247,457
ANALOG SIGNAL PEAK DETECTOR USING TAPPED DELAY LINE AND SAMPLING MEANS
Reginald A. Kaenel, Murray Hill, N.J., assignor to Bell Telephone Laboratories, Incorporated, New York, N.Y., a corporation of New York
Filed May 22, 1961, Ser. No. 111,735
1 Claim. (Cl. 324—103)

This invention relates to signal processing systems, and more particularly to a system for detecting the maximum value of an analog signal.

In various fields of study, for example, in impulse noise analysis investigations, it is important to be able to detect the maximum value or peak of an analog signal. The peak of an analog signal can be detected by known periodic sampling techniques, provided that the sampling rate is made sufficiently high that a high probability exists that a sampling instant will coincide or almost coincide with the occurrence of the signal peak. For a 4 kilocycles per second analog signal, a sampling rate of about 40 kilosamples per second would ensure such a high probability. This known type of detection technique is, however, relatively wasteful of sampling power and, in addition, may require an unrealizably high sampling rate if the analog signal to be studied is a relatively high frequency one.

An object of the present invention is the improvement of signal processing systems.

More specifically, an object of this invention is the provision of a peak-detecting system that is characterized by a sampling rate which is relatively low compared to the frequency of the analog signal under study.

These and other objects of the present invention are realized in a specific illustrative embodiment thereof which includes a tapped delay line whose total delay is T seconds and to one end of which is applied the analog signal whose peak is to be detected. Signals obtained from the delay line taps are applied through an OR gate to a sampling circuit whose sampling interval is approximately T seconds. Consequently, one sampling instant occurs at or about the time in which the peak of the analog signal is being applied from one of the delay line taps via the OR gate to the sampling circuit. As a result, the output of the sampling circuit comprises a plurality of signals the amplitude of at least one of which is representative of the maximum value of the analog signal.

The sampling circuit, whose sampling rate for a 4 kilocycles per second analog signal need be only about 10 kilosamples per second, provides pulse amplitude modulated (or P.A.M.) output signals which are applied to a pulse-amplitude-modulation-to-pulse-code-modulation (or P.A.M.-to-P.C.M.) converter. In turn, the output of the converter is applied to circuitry which detects the highest-valued P.C.M. word included in the output of the converter. In this way, the peak of the analog signal is reliably detected.

It is a feature of the present invention that a peak-detecting system include a delay line to one end of which is applied the analog signal under study, the line having a plurality of taps and being characterized by a total delay of T seconds, an OR gate responsive to signals appearing at the taps of the delay line, and a circuit for sampling the output of the OR gate at a rate of 1/T samples per second.

It is another feature of this invention that a system for detecting the maximum amplitude of an analog signal to be studied include a delay line for receiving the analog signal, the line having a plurality of taps and being characterized by a total delay of T seconds, an OR gate having a plurality of input terminals respectively connected to the delay line taps, a circuit for sampling the output of the OR gate at a rate of 1/T samples per second to provide a group of P.A.M. signals at least one of which is representative of the maximum amplitude of the analog signal, a P.A.M.-to-P.C.M. converter connected to the output of the sampling circuit, and circuitry for detecting the highest-valued P.C.M. code word output of the converter.

A complete understanding of the present invention and of the above and other features and advantages thereof may be gained from a consideration of the following detailed description of an illustrative embodiment thereof presented hereinbelow in connection with the accompanying drawing, in which:

FIG. 1 depicts a specific illustrative peak-detecting system made in accordance with the principles of the present invention; and FIG. 2 shows various waveforms which are helpful in understanding the mode of operation of the system illustrated in FIG. 1.

Referring now to FIG. 1, there is shown a source 10 of analog signals whose peak amplitudes are to be detected. The output of the source 10 may, for example, be represented by the uppermost waveform 30 included in FIG. 2.

With respect to the waveform 30 shown in FIG. 2, it is seen that if in accordance with known periodic sampling techniques the amplitude of the depicted waveform were sampled at a rate of 1/T times per second, at each of the instants marked a through d in FIG. 2, the positive peak thereof would not be detected. Only by increasing the sampling rate to, say, 4/T times per second could such known techniques be made effective to detect the peak of the waveform 30 in a reliable manner. By contrast, the specific system described in detail hereinbelow as being an illustrative embodiment of the principles of the present invention is capable of detecting the peak of the waveform 30 even though the system samples the amplitude of the signal under study at the relatively low rate of 1/T times per second.

The output of the source 10 of the illustrative system shown in FIG. 1 is coupled via lead 11 to the input end of a conventional delay line 12 which includes four equally-spaced taps 13 through 16, the tap 13 being connected to the input end of the line 12 and the tap 16 being connected to the output end thereof. The total time delay experienced by a signal in passing from the input end of the line 12 to the terminal tap 16 is T seconds. Accordingly, signals appear at the taps 14 and 15 in $T/3$ and $2T/3$ seconds, respectively, after being applied to the input end of the line 12.

As indicated in FIG. 1, the signals which appear at the taps 13 through 16 of the delay line 12 are respectively designated by the letters A through D. These four signals are applied to the four diodes 21 through 24, respectively, of an OR gate 20 which also includes a resistor 25 and a negative direct-current bias source 26. It is noted that the waveforms of the four signals A through D which are applied from the line 12 to the gate 20 are plotted together in their proper time relationship on a single axis in the middle of FIG. 2.

The values of the bias source 26 and its associated resistor 25 of the OR gate 20 shown in FIG. 1 are selected such that any positive input signal whose amplitude is above a predetermined minimum level E (FIG. 2) appears as an output signal on lead 27 of the OR gate 20. At any moment, the level of the signal which appears on the output lead 27 of the gate 20 is representative of the most positive one of the signals which are applied as inputs thereto. Hence, the waveform of the signal which appears at the output of the OR gate 20 in response to the application thereto of the signals A through D is of the form shown at the bottom of FIG. 2.

With respect to the bottommost waveform shown in FIG. 2, it is seen that the sampling thereof at a rate of $1/T$ times per second, at each of the instants marked $a$ through $d$, results in one instant, viz., the instant $b$, occurring at the time in which a level representative of the peak of the analog signal under study appears on the output lead 27 of the OR gate 20. The sampling operation is performed by a sampling circuit 40, illustratively, of the type described in "Pulse and Digital Circuits" by J. Millman and H. Taub, McGraw-Hill, 1956, page 434, which provides at its output a plurality of P.A.M. signals. One of these P.A.M. signals, specifically, the one generated by the circuit 40 in response to the sampling of the output of the OR gate 20 at the instant $b$, is representative of the maximum amplitude of the analog signal output of the source 10.

The P.A.M. signals supplied by the sampling circuit 40 are applied to a conventional P.A.M.-to-P.C.M. converter 50 of the linear type, which in response to each such signal generates a multidigit binary code word, illustratively, a 3-digit word, that is representative of the P.A.M. signal. In turn, code words from the converter 50 are applied to circuitry 60 which detects the highest-valued P.C.M. word applied thereto by the converter 50. This highest-valued P.C.M. word is, of course, representative of the maximum amplitude of the analog signal under study. It is noted that the circuitry 60 may, for example, be a high speed general purpose digital computer, such as the IBM 7090, which, as is well known, may be programmed in a straightforward manner to detect the maximum one of a group of code words.

It is emphasized that the specific illustrative system described herein is capable of reliably detecting the peak of a 4-kilocycles per second analog signal even though the circuit 40 thereof samples the output of the gate 20 at the relatively low rate of 10 kilosamples per second.

It is significant to note that in a system embodying the principles of the present invention the number of taps on the delay line 12 is advantageously selected to be a function of the number of binary digits included in each P.C.M. output word from the converter 50. Specifically, for a system whose sampling rate is $1/T$ and which is to process a baseband signal whose maximum frequency is $f_o$, the minimum number of equally-spaced taps equals the integer or next higher integer defined by the ratio $T/t$, where $$\frac{N}{2}(1-\cos \pi \cdot f_o \cdot t) = 1$$

with N equal to the number of quantizing steps characteristic of the P.A.M.-to-P.C.M. converter 50.

It is to be understood that the above-described arrangements are illustrative of the application of the principles of the invention. Numerous other arrangements may be devised by those skilled in the art without departing from the spirit and scope of the invention. For example, although emphasis herein has been directed to the detection of the positive peak of an analog signal, it would, of course, be entirely straightforward to reverse the polarity of the source 26 and, in addition, the manner in which the diodes 21 through 24 are poled, thereby to convert the described system to one which is capable of detecting the negative peak of an analog signal.

What is claimed is:

In combination in a system for detecting the maximum amplitude of an analog signal to be studied, whose maximum frequency is $f_o$, a delay line having a plurality of equally-spaced taps including input and output taps, said line being characterized by a total delay of T seconds between said input and output taps, means for applying said analog signal to be studied to only the input tap of said line, an OR gate having a plurality of input terminals and a single output terminal, means respectively connecting said input terminals to said delay line taps for applying to said gate successive replicas of the analog signal propagated by said delay line, a circuit connected to said OR gate output terminal for sampling the output of said gate at a rate of $1/T$ samples per second to provide a group of output pulse amplitude modulated signals one of which is representative of the maximum amplitude of said analog signal, a converter, characterized by N quantizing steps, responsive to said group of pulse amplitude modulated signals for providing an output pulse code modulated word representative of each pulse amplitude modulated signal, and circuitry responsive to the output of said converter for detecting the highest-valued one of said pulse code modulated words, the minimum number of taps on said delay line being equal to the integer or next higher integer defined by the ratio $T/t$, where $$\frac{N}{2}(1-\cos \pi \cdot f_o \cdot t) = 1$$

References Cited by the Examiner

UNITED STATES PATENTS

| | | | |
|---|---|---|---|
| 2,303,968 | 12/1942 | White | 328—58 |
| 2,764,678 | 9/1956 | Craib | 328—58 |
| 2,836,356 | 5/1958 | Forrest | 324—99 |
| 2,943,262 | 6/1960 | Ball | 328—115 |
| 2,996,624 | 8/1961 | Mumma | 328—58 X |
| 3,068,417 | 12/1962 | Fiske | 328—58 X |

WALTER L. CARLSON, *Primary Examiner.*

FREDERICK M. STRADER, *Examiner.*